United States Patent [19]

Gleason

[11] 3,772,608

[45] Nov. 13, 1973

[54] CHARGED-PARTICLE TRIGGERED DISCHARGE FOR A LASER

[75] Inventor: Thomas J. Gleason, Silver Spring, Md.

[73] Assignee: The United States of America as represented by the Secretary of the Army, Washington, D.C.

[22] Filed: Sept. 27, 1971

[21] Appl. No.: 183,920

[52] U.S. Cl. .................... 331/94.5, 330/4.3, 313/54
[51] Int. Cl. .......................... H01s 3/09, H01s 3/22
[58] Field of Search .................... 331/94.5; 330/4.3; 313/54

[56] References Cited
UNITED STATES PATENTS
2,747,121  5/1956  Silver ................................. 313/54
3,641,454  2/1972  Krawetz .......................... 331/94.5

OTHER PUBLICATIONS

Andriakhin et al., Journal of Experimental and Theoretical Physics—Pis. Red. 8(7) p Oct 68, pp 346–349 (corresponding English Translation Furnished – pp 214–216)

Primary Examiner—David Schonberg
Assistant Examiner—R. J. Webster
Attorney—Harry M. Saragovitz et al.

[57] ABSTRACT

Method and apparatus for triggering a discharge in a laser utilizing charged particles. A source of charged particles injects a beam of charged particles throughout the discharge volume of a laser to create uniform ionization therein and thus trigger the electrical discharge needed to excite the lasing medium. This allows the applied electric field to be optimized for excitation without regard to the field required to initiate the discharge in an un-ionized fluid. The beam of charged particles initiates the discharge by providing an initial ion and electron population within the discharge volume. The charged particle beam may be created by several means including a radioactive source, or artificial sources such as electron guns, particle accelerators, or other devices which produce a directed flow of charged particles with sufficient energy to penetrate the active lasing fluid over the entire discharge volume.

2 Claims, 6 Drawing Figures

PATENTED NOV 13 1973                    3,772,608

INVENTOR,
THOMAS J. GLEASON
BY Harry M. Saragovitz
   Edward J. Kelly
   Herbert Berl, ATTORNEYS
   Perry J. Saidman, AGENT

CHARGED-PARTICLE TRIGGERED DISCHARGE FOR A LASER

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

This invention relates to laser discharges, and more particularly, to a method and apparatus for triggering a discharge in a laser.

2. Description of the Prior Art

The initiation of an electrical discharge in a fluid requires a minimum electric field that is dependent on the properties of the fluid, such as for example the pressure in a gas. The optimum field in the discharge after it is initiated should be controlled by the most efficient operating point for the selected excitation processes which result in population inversion and lasing. This type of two step voltage optimization is often done in continuous discharges by utilizing a high voltage pulse to initiate the discharge and then utilizing a lower voltage to sustain the discharge at its optimum value for laser action. In a fast pulsed laser it is generally impossible to change the voltage once the pulse is started, such that the high voltage required to break down the gas must be utilized throughout the pulse, resulting in non-optimum excitation. Overvolting to initiate such discharges may additionally have undesirable side effects, such as corona discharges or localized discharges. Thus, it would appear that a system for eliminating the necessity in a laser system of applying a breakdown voltage to trigger the discharge would be highly desirable.

It is therefore one object of the present invention to provide a method and apparatus for triggering a discharge in a laser that does not require the use of a high breakdown voltage.

Another object is to provide a method for triggering the discharge in a laser that allows the optimization of the applied electric field independently of the conditions necessary to initiate the discharge.

A further object of the present invention is to provide a system for triggering the discharge in a laser that creates a uniform ionization throughout the discharge volume resulting in increased efficiency and effectiveness of the discharge in exciting the lasing medium.

SUMMARY OF THE INVENTION

Briefly, in accordance with the invention, a system is provided for triggering a discharge in a laser by injecting a beam of charged particles into the discharge volume to create uniform ionization therein. The beam of charged particles initiates the discharge by providing a high initial ion and electron population within the discharge volume. The use of a beam of charged particles to ionize the fluid medium within the discharge volume allows the applied electric field to be optimized independently of those conditions necessary to initiate the discharge. The source of charged particles may be provided by a radioactive source such as an alpha or beta ray emitter. Alternatively, an artificial source of charged particles may be utilized, such as an electron gun, particle accelerator or other device which produces a directed flow of charged particles with sufficient energy to penetrate the active fluid throughout the discharge volume. A unique hollow electrode structure is disclosed that may be utilized to contain a natural radioactive source.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
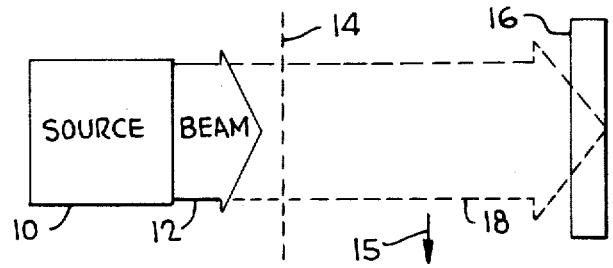
FIG. 1 is a schematic representation of a transverse excited laser system in accordance with the present invention.

FIG. 1 illustrates in schematic form one possible laser system embodying the principles of the present invention. Illustrated is a source of charged particles 10, a grid electrode or thin film electrode 14, and a plate or grid electrode 16. The source of charged particles 10 may be provided by several means. A radioactive source may be utilized to emit alpha, beta particles, or heavier decay products. Alternatively, an artificial source of charged particles can be used, such as for example an electron gun, a particle accelerator or other device which produces a direct flow of charged particles with sufficient energy to penetrate the lasing medium over the entire region between electrodes 14 and 16. The particles may be electrons, protons, alpha particles, or ions; in fact any conviently produces charged atomic or subatomic particle may be utilized in accordance with the principles of the present invention. Such particles would create ionization throughout their path by collisions with atoms or molecules of the active lasing medium, thus leaving a population of ions and electrons throughout the volume thus penetrated. The active lasing medium may be a gas or a liquid or a mixture of several constituents. Ionization may occur in any or all of the constituents and is understood not to be limited to just the lasing atom or molecule. The use of the beam of charged particles 12 to preionize the fluid medium allows the applied electric field (not shown) to be optimized for laser excitation without regard to the field required to initiate the discharge in an un-ionized fluid. The beam of charged particles 12 initiates the discharge 18 over the entire region between electrodes 14 and 16, whereupon the applied electric field excites the ionized lasing medium, thus stimulating the emission of radiation along lasing axis 15.

Figure 2:
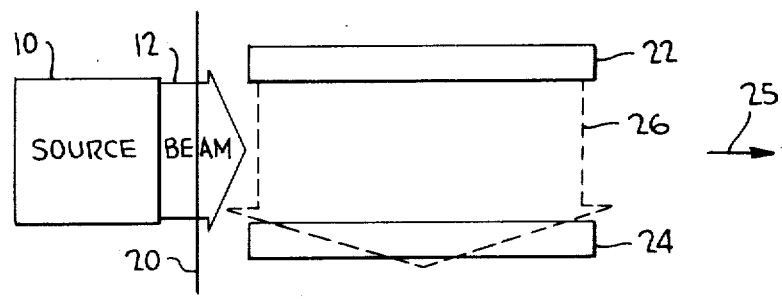
FIG. 2 is a schematic representation of another embodiment of a transverse excited laser in accordance with the present invention.
Figure 3:
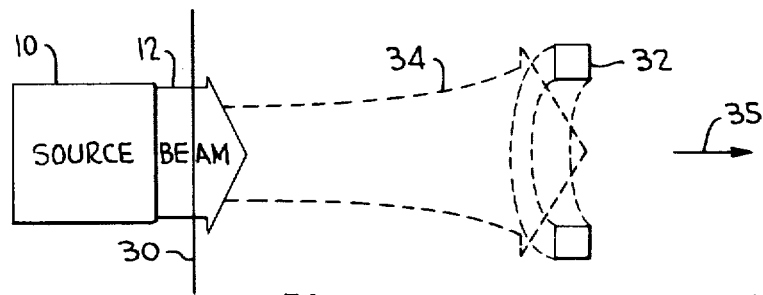
FIG. 3 is a schematic illustration of an axially excited laser according to the teachings of the present invention.

FIG. 2 shows another schematic illustration of a transverse excited laser system according to the present invention. In this system, source of charged particles 10 emits a beam of charged particles 12 through a thin film mirror 20 that allows beam 12 to pass therethrough. Electrodes 22 and 24, which may be of any well-known structure such as grids, pins, plates or wires, have an electric field applied thereto that has been optimized for exciting laser emission within the active medium. It is seen in FIG. 2 that the electrical discharge 26 is transverse to beam 12, and that the lasing axis 25 is transverse to discharge path 26. This shows, when viewed in combination with FIG. 1 that the direction of the charged particle beam and resultant electrical discharge can be made independent. Referring now to FIG. 3, a source of charged particles 10 injects a beam of charged particles 12 through a thin film or ring electrode 30 to initiate an electrical discharge 34 which excites the lasing medium in the discharge volume. Ring electrode 32 permits the axially excited laser beam to exit along lasing axis 35.

Figure 4:
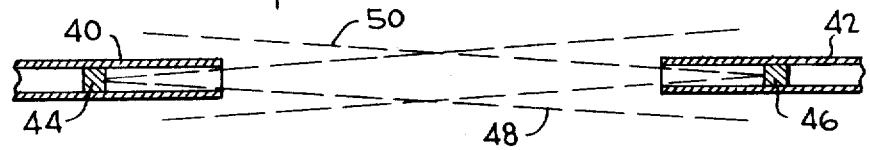
FIG. 4 is a cross-sectional view of one embodiment of an electrode pair in accordance with the present invention.
Figure 5:
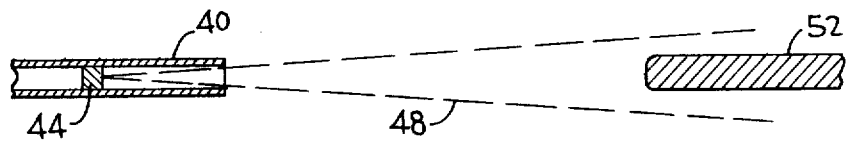
FIG. 5 is another embodiment of an electrode pair.
Figure 6:
FIG. 6 illustrates another embodiment of a pair of electrodes in accordance with the teachings of the present invention.

FIGS. 4, 5 and 6 show possible configurations of electrode pairs that may be utilized to house a radioactive source within the context of the present invention. FIG. 4 shows a cross-sectional view of a pair of electrodes 40 and 42 that are hollowed-out in one end and contain a radioactive source of charged particles 44 and 46, respectively. The pair of radioactive sources 44 and 46 emit a pair of charged particle beams 48 and 50, respectively, into the discharge region of the laser. FIG. 5 illustrates a pair of electrodes 40 and 52, only the former of which contains a radioactive source 44 for emitting a beam of charged particles 48. FIG. 6 illustrates a pair of electrodes 54 and 58, the former of which is partially hollowed-out to contain a radioactive source 56 that emits a beam of charged particle 60 into the discharge volume of the laser. As is evident from the foregoing, one or both of the electrodes in each pair may be constructed with a hollow portion to contain the radioactive source. The hollow portion may extend throughout the length of the electrode, but should be at least deep enough to collimate the charged particle beam emerging therefrom so that it encompasses the second electrode of the set to exclusion of any third electrode. This collimation can eliminate any cross-talk problems which occur frequently in electrode structures of this nature.

It is seen that I have provided a charged particle triggered discharge for a laser that utilizes a beam of charged particles to create uniform ionization throughout the discharge volume of a laser. The resulting capability to optimize the discharge electric field without being limited to voltages high enough to create their own ionization has heretofore been unattained. The provision of an initial population of ions and electrons uniformly distributed througout the discharge volume is very beneficial in terms of the efficiency and effectiveness of the discharge in exciting the lasing medium. It is apparent that the efficient volume excitation of a fluid by an electrical discharge is enhanced when the discharge is initiated stimultaneously over its entire path, as provided by the present invention.

I wish it to be understood that I do not desire to be limited to the exact details of construction shown and described, for obvious modifications will occur to a person skilled in the art.

I claim as my invention:

1. A method of triggering a pulse discharge in a device for producing stimulated emission of radiation having a discharge region located therein, comprising the steps of:
   a. providing a laser medium within said discharge region;
   b. providing electrode means about said discharge region, said electrode means comprising at least one pair of electrodes;
   c. providing at least one collimated beam of charged particles to said discharge region by providing at least one radioactive pellet and at least one electrode having a hollow open-ended portion facing the discharge region and the other electrode of said electrode pair, said radioactive pellet being positioned within said hollow portion for emitting said charged particle beam into said discharge region for causing uniform ionization of said laser medium through said discharge region, said hollow portion being deep enough to collimate said charged particle beam for encompassing the other electrode of said pair opposite to it to the exclusion of any additional electrode included in said electrode means;
   d. applying an electric field to said discharge region via said electrode means for creating a population inversion is said laser medium.

2. Apparatus for triggering a pulse discharge in a device for producing stimulated emission of radiation having a discharge region located therein, comprising:
   a. electrode means located about said discharge region, said electrode means comprising at least one pair of electrodes;
   b. a laser medium located within said discharge region;
   c. means for providing at least one collimated beam of charged particles to said region comprising at least one radioactive pellet and at least one electrode having a hollow open-ended portion facing the discharge region and the other electrode of said electrode pair, said radioactive pellet being positioned within said hollow portion for emitting said charged particle beam into said discharge region for causing uniform ionization of said laser medium through said discharge region, said hollow portion being deep enough to collimate said charged particle beam for encompassing the other electrode of said pair opposite to it to the exclusion of any additional electrode included in said electrode means;
   d. means for applying an electric field to said discharge region via said electrode means for creating a population inversion in said laser medium.

* * * * *